(12) United States Patent
Taitz et al.

(10) Patent No.: US 11,524,676 B2
(45) Date of Patent: Dec. 13, 2022

(54) SYSTEM AND METHOD FOR TWO STEP MOTOR FOR ELECTRIC VEHICLE (EV) TRUCK AND COMMERCIAL VEHICLE APPLICATIONS

(71) Applicant: Shem, LLC, Highland Park, IL (US)

(72) Inventors: Andrew Taitz, Miami, FL (US); Johann Vorster, Durbanville (ZA); Steve Moss, Durbanville (ZA); Dion Van Leeve, Birmingham, AL (US)

(73) Assignee: SHEM, LLC, Highland Park, IL (US)

( * ) Notice: Subject to any disclaimer, the term of this patent is extended or adjusted under 35 U.S.C. 154(b) by 207 days.

(21) Appl. No.: 17/100,454

(22) Filed: Nov. 20, 2020

(65) Prior Publication Data

US 2021/0155222 A1     May 27, 2021

Related U.S. Application Data

(60) Provisional application No. 62/939,245, filed on Nov. 22, 2019.

(51) Int. Cl.
| | |
|---|---|
| *B60W 20/15* | (2016.01) |
| *B60W 10/06* | (2006.01) |
| *B60W 10/08* | (2006.01) |
| *B60W 10/02* | (2006.01) |
| *B60K 6/26* | (2007.10) |
| *H02K 7/00* | (2006.01) |
| *H02K 7/108* | (2006.01) |

(Continued)

(52) U.S. Cl.
CPC ............ *B60W 20/15* (2016.01); *B60K 6/26* (2013.01); *B60K 6/387* (2013.01); *B60W 10/02* (2013.01); *B60W 10/06* (2013.01); *B60W 10/08* (2013.01); *H02K 7/006* (2013.01); *H02K 7/108* (2013.01); *H02P 5/74* (2013.01); *B60W 2520/10* (2013.01); *B60W 2530/10* (2013.01); *B60Y 2200/92* (2013.01)

(58) Field of Classification Search
None
See application file for complete search history.

(56) References Cited

U.S. PATENT DOCUMENTS

| | | | | |
|---|---|---|---|---|
| 6,862,887 B2 * | 3/2005 | Noreikat | ................ | B60K 6/442 903/952 |
| 7,992,661 B2 * | 8/2011 | Nomura | ................ | F16F 15/123 180/65.245 |

(Continued)

FOREIGN PATENT DOCUMENTS

| | | | |
|---|---|---|---|
| DE | 102013205080 A1 | 10/2013 | |
| GB | 2478333 B | 11/2013 | |
| WO | WO-2008071151 A1 * | 6/2008 | ............. B60K 6/442 |

*Primary Examiner* — Dirk Wright
(74) *Attorney, Agent, or Firm* — Brooks Kushman P.C.

(57) ABSTRACT

In at least one embodiment, a system for a class 7 or 8 vehicle is provided. The system includes a first motor, a second motor, and a controller. The first motor is configured to generate torque for the vehicle. The second motor is configured to drive an engine of the vehicle such that the vehicle meets a desired speed as set forth by a driver. The controller is configured to drive at least one of the first motor and the second motor and to receive a first signal indicative of a speed of the vehicle. The controller is further configured to deactivate the first motor if the speed of the vehicle is greater than a predetermined speed limit.

20 Claims, 3 Drawing Sheets

(51) Int. Cl.
*H02P 5/74* (2006.01)
*B60K 6/387* (2007.10)

(56) References Cited

U.S. PATENT DOCUMENTS

| | | | |
|---|---|---|---|
| 8,465,387 B2 * | 6/2013 | Conlon | B60K 6/445 180/65.23 |
| 8,838,313 B2 * | 9/2014 | Bolenbaugh | B60L 7/14 903/930 |
| 9,038,759 B2 | 5/2015 | Kaneko et al. | |

* cited by examiner

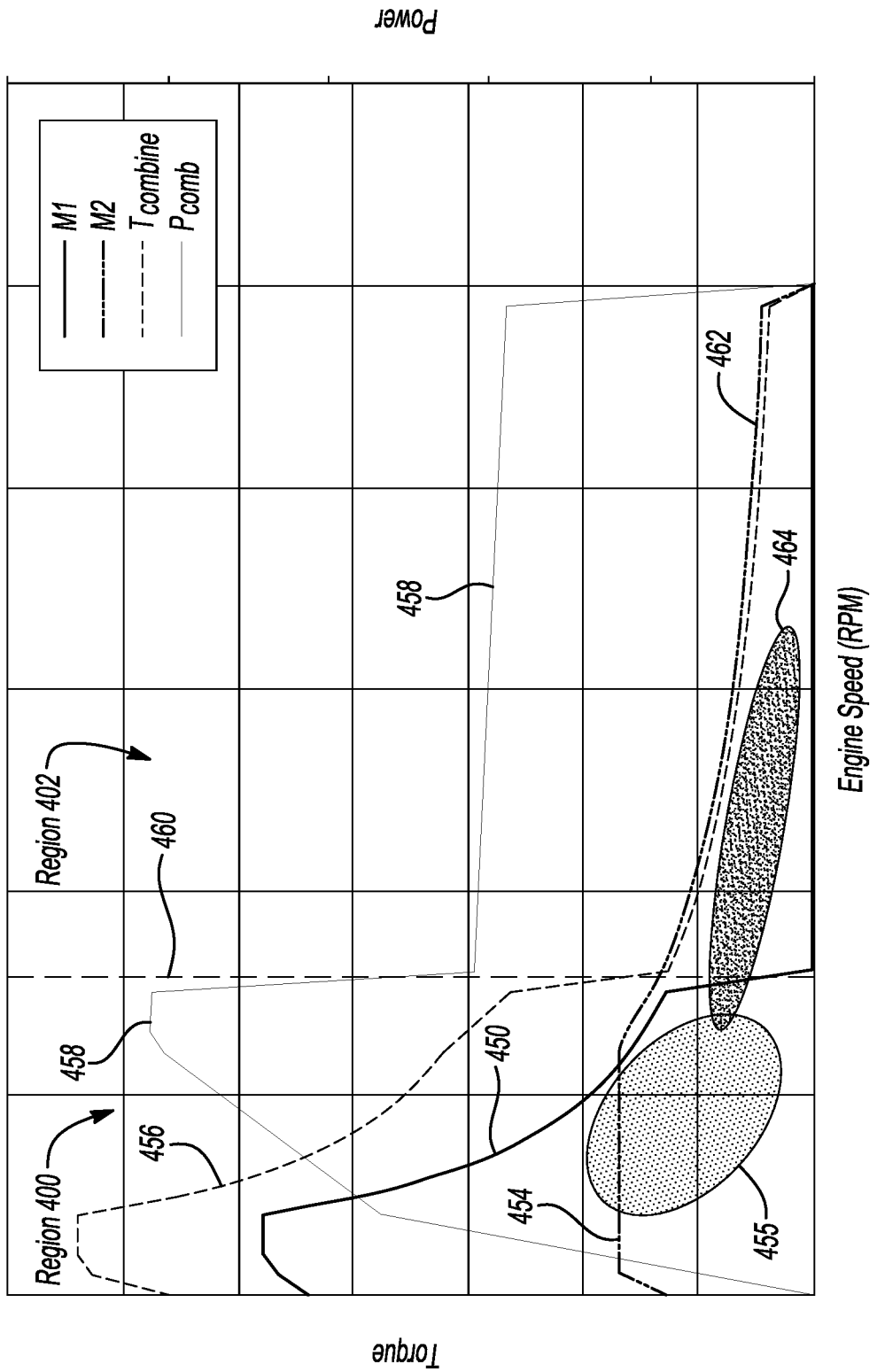

SYSTEM AND METHOD FOR TWO STEP MOTOR FOR ELECTRIC VEHICLE (EV) TRUCK AND COMMERCIAL VEHICLE APPLICATIONS

CROSS-REFERENCE TO RELATED APPLICATIONS

This application claims the benefit of U.S. provisional application Ser. No. 62/939,245 filed Nov. 22, 2019, the disclosure of which is hereby incorporated in its entirety by reference herein.

TECHNICAL FIELD

Aspects disclosed herein generally relate to a system and method for a two-step motor for electric vehicle (EV) truck and commercial vehicle applications. These aspects and others will be discussed in more detail below.

BACKGROUND

U.S. Pat. No. 9,038,759 to Kaneko et al. ("Kaneko") discloses a hybrid work vehicle which is simple in configuration. The hybrid work vehicle includes: an engine; a hydraulic pump which is driven by the engine; a work device which is disposed at the front of the vehicle and performs work using the hydraulic pump as a drive source; a motor/generator which generates electric power by use of the torque of the engine; and a travel drive device which causes the vehicle to travel by rotating and driving wheels by use of the electric power generated by the motor/generator. The hybrid work vehicle is steered while the vehicle bends by way of a center joint. The travel drive device includes: a plurality of electric motors; and a propeller shaft which is linked with the plurality of electric motors and transmits motive power from the plurality of electric motors to the wheels. The plurality of electric motors are disposed at the front and rear sides of the center joint with the center joint being disposed therebetween.

SUMMARY

In at least one embodiment, a system for a class 7 or 8 vehicle is provided. The system includes a first motor, a second motor, and a controller. The first motor is configured to generate torque for the vehicle. The second motor is configured to drive an engine of the vehicle such that the vehicle meets a desired speed as set forth by a driver. The controller is configured to drive at least one of the first motor and the second motor and to receive a first signal indicative of a speed of the vehicle. The controller is further configured to deactivate the first motor if the speed of the vehicle is greater than a predetermined speed limit.

In at least another embodiment, a system for a class 7 or 8 vehicle is provided. The system includes a first motor, a second motor, and a controller. The first motor is configured to generate torque for the vehicle. The second motor is configured to drive an engine of the vehicle such that the vehicle meets a desired speed as set forth by a driver. The controller is configured to drive at least one of the first motor and the second motor and to receive a first signal indicative of a speed of one of the first motor and the second motor. The controller is further configured to deactivate the first motor if the speed of the vehicle is greater than a predetermined speed limit.

In at least another embodiment, a system for a class 7 or 8 vehicle is provided. The system includes a first motor, a second motor, and a clutch. The first motor is configured to generate torque for the vehicle. The second motor is configured to drive an engine of the vehicle such that the vehicle meets a desired speed as set forth by a driver. The clutch is configured to couple at least one of the first motor and the second motor to a driveline of a transmission to generate the torque for the vehicle and to disengage the first motor from the driveline if a speed of the vehicle is greater than a predetermined speed limit.

In at least another embodiment, a system for a class 7 or 8 vehicle is provided. The system includes a first motor, a second motor, and a clutch. The first motor is configured to generate torque for the vehicle. The second motor is configured to drive an engine of the vehicle such that the vehicle meets a desired speed as set forth by a driver. The clutch is configured to couple at least one of the first motor and the second motor to a driveline of a transmission to generate the torque for the vehicle and to drive the engine of the vehicle such that the vehicle meets the desired speed as set forth by the driver. The clutch is further configured to disengage the first motor from the driveline if a speed of one of the first motor and the second motor is greater than a predetermined speed limit.

In at least another embodiment, a method is disclosed. The method includes generating torque for a class 7 or 8 vehicle with a first motor and driving an engine of the class 7 or 8 vehicle with a second motor such that the class 7 or 8 vehicle meets a desired speed as set forth by a driver. The method further includes electronically controlling at least one of the first motor and the second motor and electronically receiving a first signal indicative of a speed of the vehicle. The method further includes electronically deactivating the first motor if the speed of the vehicle is greater than a predetermined speed limit.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 4 depicts a plot for providing a high torque and high speed for the EV truck or EV commercial vehicle application in accordance to one embodiment.

DETAILED DESCRIPTION

Figure 1:
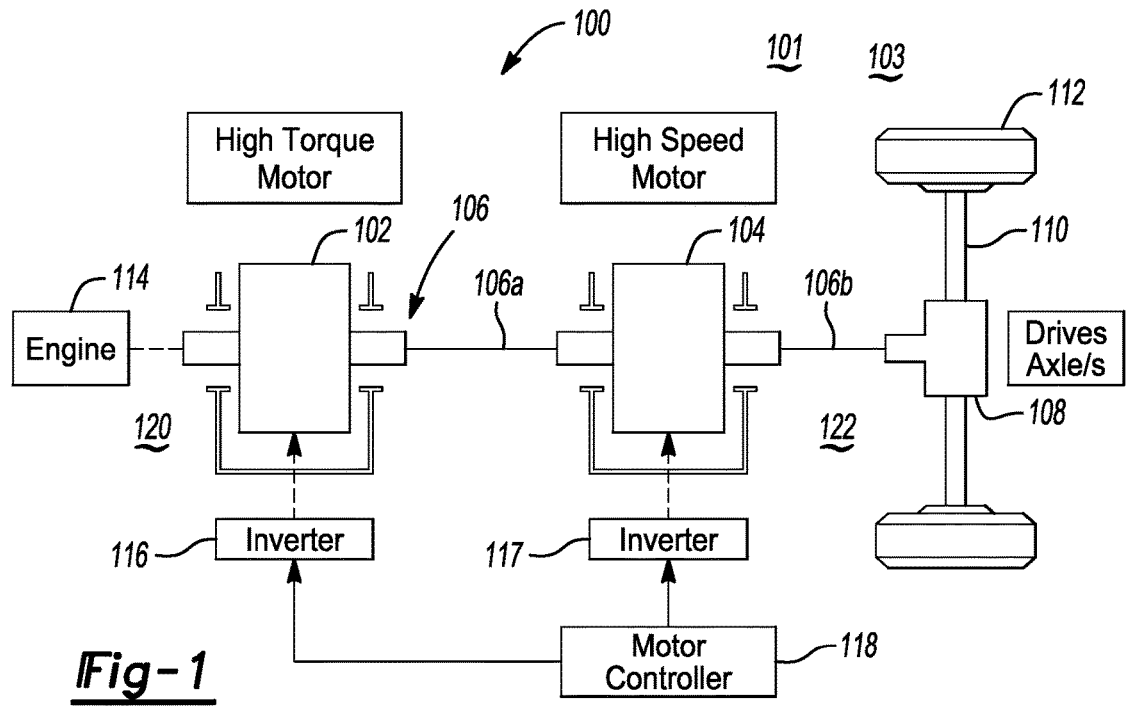
FIG. 1 depicts a system for providing a plurality of motors for an EV truck or EV commercial vehicle application in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilize one or more microprocessors to execute a computer-program that is embodied in a non-transitory computer readable medium that is programmed to perform the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for transmitting and receiving data, respectively, to and from other hardware-based devices as discussed herein.

Aspects disclosed herein provide, but not limited to, a system and a method for combining a first motor (e.g., a high torque electrical motor) and a second motor (e.g., a high speed electrical motor) that are either in a series with one another or parallel with one another to eliminate the use of a multi-speed gearbox for commercial EV applications or for class 7 and class 8 vehicles. A class 7 or class 8 vehicle may be considered a heavy-duty truck under the U.S. gross vehicle weight rating (GVWR) system, with a class 7 vehicle having a gross weight limit of 26,001-33,000 pounds, and a class 8 vehicle having a gross weight of 33,001 pounds or more.

The current EV landscape may be dominated by permanent magnet alternating current (AC) motors in terms of efficiency. A single motor solution may be common for passenger cars, but such a solution may be a challenge for heavy commercial vehicles such the Class 7 and 8 vehicles. Most heavy duty EV vehicles, larger than, for example, 10000 lbs GCW, also need to meet gradeability requirements with heavy loads and achieve highway road speeds. To meet these requirements, a two speed or multi speed gearbox mechanism is required to meet the launch-ability and gradeability requirements as well as greater road speeds of up to 65 mph or higher at acceptable performance levels. Commercial vehicles are required to deliver higher payloads than their passenger car cousins. This aspect may place a higher torque requirement at a low speed to achieve the start-ability and gradeability required to move heavier payloads for Class 7 and 8 vehicles. Achieving the gradeability and start-ability results in the selection of an EV motor with high torque or high speed. This may necessitate a gearbox to be able to meet the high torque requirement at low speed and the ability to achieve higher speeds utilizing higher gears. The embodiments disclosed herein provide a way of combining, for example, a high torque electrical motor either in series or in parallel with a high-speed electrical motor so as to cover torque and speed range requirements in a commercial vehicle application while eliminating the need for a multi-speed gearbox to accomplish the desired performance. It is generally advantageous to remove the multi-speed gearbox since the gearbox itself includes many moving parts which may reduce reliability and may require comparatively frequent servicing and fluid changes. The embodiments as disclosed herein may enable Class 7 or 8 trucks to carry loads and launch at, for example, 25% of a slope on a road.

In general, two electrical motors may be coupled in series with one another or in parallel with one another to drive a common traction axle. One motor may be optimized for low speed tractive torque and the other motor may be optimized for higher speed. At low speeds, both motors are engaged. Once the speed limit of the high torque motor is reached, the high torque motor may be deenergized electrically thereby leaving the high-speed motor to handle the high-speed portion of the driveline application profile for the vehicle.

FIG. 1 depicts a system 100 for an EV truck 101 or EV commercial vehicle application 103 (referred to hereafter as "EV truck 101") in accordance to one embodiment. In one example, the system 100 may be utilized for Class 7 or 8 vehicles. Additionally, the EV truck 101 (or vehicle) may be a class 7 vehicle having a gross weight limit of 26,001-33,000 pounds or class 8 vehicle having a gross weight of 33,001 pounds or more.

The system 100 includes a first motor 102 and a second motor 104. A drive shaft 106 is coupled to each of the first motor 102 and the second motor 104 (e.g., drive shaft 106a is positioned between the first motor 102 and the second motor 104 and drive shaft 106b is positioned between the second motor 104 and a rear differential 108). The rear differential 108 is coupled to the drive shaft 106 for rotating a rear axle 110 and corresponding wheels 112 that are attached to the rear axle 110. An engine 114 generates power for the EV truck 101, the first motor 102 and/or the second motor 104 rotate to thereby transmit motive power to the drive shaft 106 so that the wheels 112 rotate via the differential 108. As the drive shaft 106 rotates, the differential 108 rotates to transfer torque to the wheels 112 for rotating the same.

A first inverter 116 receives direct current (DC) power from one or more batteries (not shown) and converts the DC power into an alternating current (AC) power to drive the first motor 102. A second inverter 118 also receives DC power from the one or more batteries and converts the DC power into the AC power to drive the second motor 104. A motor controller 118 is coupled to the inverter 116 for controlling the operation of the first motor 102. The motor controller 118 is also coupled to the inverter 117 for controlling the operation of the second motor 104. It is recognized that the first inverter 116 and/or the second inverter 117 may be separate from the motor controller 118. Additionally, the motor controller function may be integrated on the first inverter 116 or the second inverter 117. In one example, the first motor 102 may be a high torque motor. The first motor 102 may be energized to provide torque for the vehicle 101. For example, the first motor 102 may be engaged (or driven by the inverter 116) to achieve launch-ability and low speed gradeability. The second motor 104 may be energized, via the second inverter 117, to provide a higher engine speed (or vehicle speed) when the vehicle 101 is required to operate at higher road speeds. Each of the first motor 102 and the second motor 104 are configured to drive the rear axle 110.

The first motor 102 is generally arranged to incorporate a relatively low upper speed limit or maximum RPM. One or more first sensors 120 (hereafter "the first sensor 120") may be positioned about the first motor 102 to monitor vehicle speed or engine speed of the EV truck 101. If engine speed is measured, then the sensor(s) 120 measure the rotations per minute (RPM) of the engine 114. The first sensor 120 may transmit signals indicative of the measured RPM to the controller 118. The controller 118 may deactivate (or deenergize) the first motor 102 by controlling the first inverter 116 to stop providing AC power to the first motor 102 upon determining that the RPM for the first motor 102 has exceeded a predetermined RPM limit (e.g., 1500 rpm). In this instance, the first motor 102 is controlled by the controller 118 via the first inverter 116 to cease to provide torque. Alternatively, one or more second sensors 122 (hereafter "the second sensor 122") may be configured to monitor vehicle speed of the EV truck 101 or engine speed of the engine 114. The controller 118 may control the first motor 102 via the inverter 116 to provide a zero torque output upon determining that the engine speed (or vehicle speed) has exceeded a predetermined speed limit (e.g., or as noted above the predetermined RPM limit (also known as engine speed) or for example, 1500 rpm). References to deenergizing (or deactivating) the first motor 102 is commonly understood as the first inverter 116 controlling the first motor 102 (e.g., via the use of vector control) to provide a zero-output torque. It is recognized that the predetermined RPM limit may correspond to any number of values and one example of the predetermined RPM limit may be 5000 rpm). In the event the actual vehicle speed is used as a threshold to monitor with respect to deactivating the first motor 102 and activating the second motor 104, the predetermined vehicle speed limit (or predetermined speed limit) may be any number of vehicle speeds, such as for example, 9 mile per hour (mph), 15 mph, 55 mph, etc. It is recognized that engine 114 is still operably coupled to the second motor 104 when the first motor 102 is controlled to no longer provide torque for the truck 101.

Upon detecting that either the RPM for the first motor 102 exceeds the predetermined RPM or that the vehicle speed exceeds a predetermined vehicle speed limit, the motor controller 118 may then energize (if not already energized) the second motor 104, via the second inverter 117, to drive the rear axle 110 in moments in which the EV truck 101 is required to travel at greater speeds. It is recognized that the first motor 102 and the second motor 104 may be energized at the same time particularly in moments when demand for torque may be high while the demand for vehicle speed may be below the predetermined speed limit. For example, each of the first motor 102 and the second motor 104 may be both driven in the event the required torque from the truck 101 is greater than the torque capability of the first motor 102. In general, the controller 118 may assign a greater priority to the first motor 102 to optimize system efficiency. For example, the first motor 102 (or high torque motor) is already running and operates at an optimized efficiency, since the first motor 102 has the highest efficiency in this region. Any additional amount of torque that is required by the truck 101 that cannot be met by the first motor 102 is then provided by the second motor 104. The second motor 104 provides the tractive effort at higher speeds.

It is recognized that the first motor 102 may be implemented as an induction motor or a switched reluctance motor and may be suitable to address issues involving back electromotive force ("EMF"). For example, overspeed conditions applicable to the first motor 102 may result in uncontrollable EMF being generated by permanent magnets in the first motor 102 which may damage the first motor 102 or various controller(s). This condition may be avoided by implementing the first motor 102 as an induction motor or switched reluctance type motor (SRM). In this case, the controller 118 may deenergize the first motor 102 via the first inverter 116 to directly decouple the first motor 102 from mechanically driving the rear axle 110. However, the first motor 102 may stay coupled to the drive shaft 106 provided the first motor 102 is arranged to mechanically withstand the higher RPM.

The controller 118 continues to monitor vehicle speed (or engine speed) while controlling the second motor 104 (and deenergizing the first motor 102). In the event vehicle speed drops below the predetermined speed limit (or RPM drops below the predetermined RPM limit), the controller 118 may then selectively engage (or energize) the first motor 102 while deenergizing the second motor 104 to resume operation. In this case, it is desired to provide torque at lower speeds for purposes of, but not limited to, launch ability and gradeability.

Figure 2:
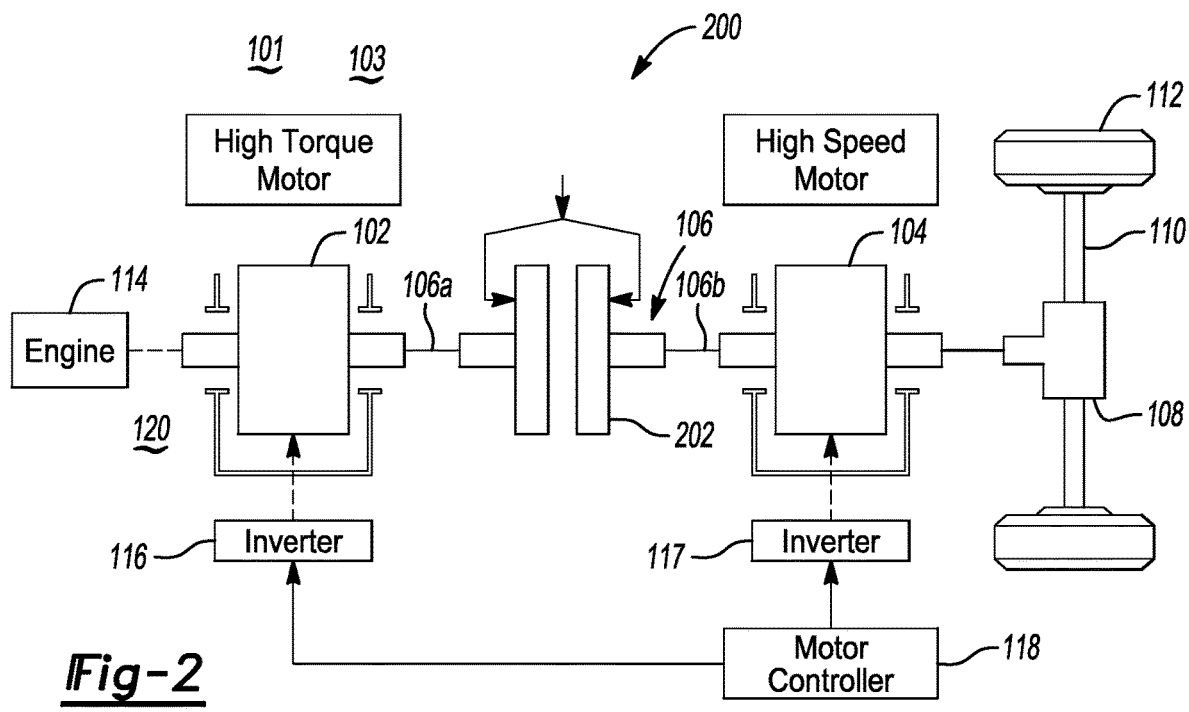
FIG. 2 depicts another system for the EV truck or EV commercial vehicle application in accordance to another embodiment.

FIG. 2 depicts another system 200 for the EV truck 101 in accordance to one embodiment. Some of the elements as set forth in connection with the system 100 in FIG. 1 are utilized in the system 200 such as for example the first motor 102, the second motor 104, the drive shaft 106, the differential 108, the first inverter 116, the second inverter 117, and the motor controller 118. The system 200 further includes a clutch 202 that may be mechanically coupled to the first motor 102 and to the second motor 104. The clutch 202 may disengage the first motor 102 from driving the rear axle 110. Alternatively, the clutch 202 may couple the first motor 102 to the rear axle 110.

The system 200 may be generally similar to the system 100 noted above with respect to utilizing the first motor 102 in moments when the vehicle speed (or engine) speed is below a predetermined vehicle speed limit or further based on a predetermined RPM limit. Thus, the clutch 202 may be engaged to couple the first motor 102 to the drive shaft 106*a*. In this instance, the EV truck 101 may be required to provide torque at lower speeds to support vehicle launch ability and/or gradeability requirements. When the EV truck 101 is required to exceed the predetermined speed limit (e.g., vehicle operator desires to operate the EV truck 101 at greater speeds), the clutch 202 may disengage the first motor 102 from the drive train 106*b*. In this case, the controller 118 may energize the second motor 104 to ensure that the EV truck 101 meets the desired speed requirements as set forth by the driver. The second motor 104 may drive the wheels 112 via the drive train 106*b*, the differential 108, and the rear axle 110.

Similarly to the system 100 noted above, once vehicle speed (or engine speed) falls below the predetermined speed limit, it may be necessary to provide more torque in this instance. Thus, the clutch 202 may be engaged to couple the first motor 102 back to the drive train 106*a* and 106*b* and subsequently to the differential 108 and the rear axle 110 to drive the wheels 112. The second motor 104 may be deactivated or deenergized by the controller 118 (e.g. the controller 118 may control the second inverter 117 to cease providing the AC power to the second motor 104). The first motor 102 and the second motor 104 as set forth in the system 200 may be implemented, for example, as permanent magnet motors. The particular type of motor implemented for the first motor 102 and the second motor 104 may vary based on the desired criteria of a particular implementation. While the first motor 102 and the second motor 104 are illustrated as being separate units, it is recognized that the first motor 102 and the second motor 104 may be combined into a single unit and that different packaging variations may be utilized to maximize efficiency of the various motors 102, 104.

Figure 3:
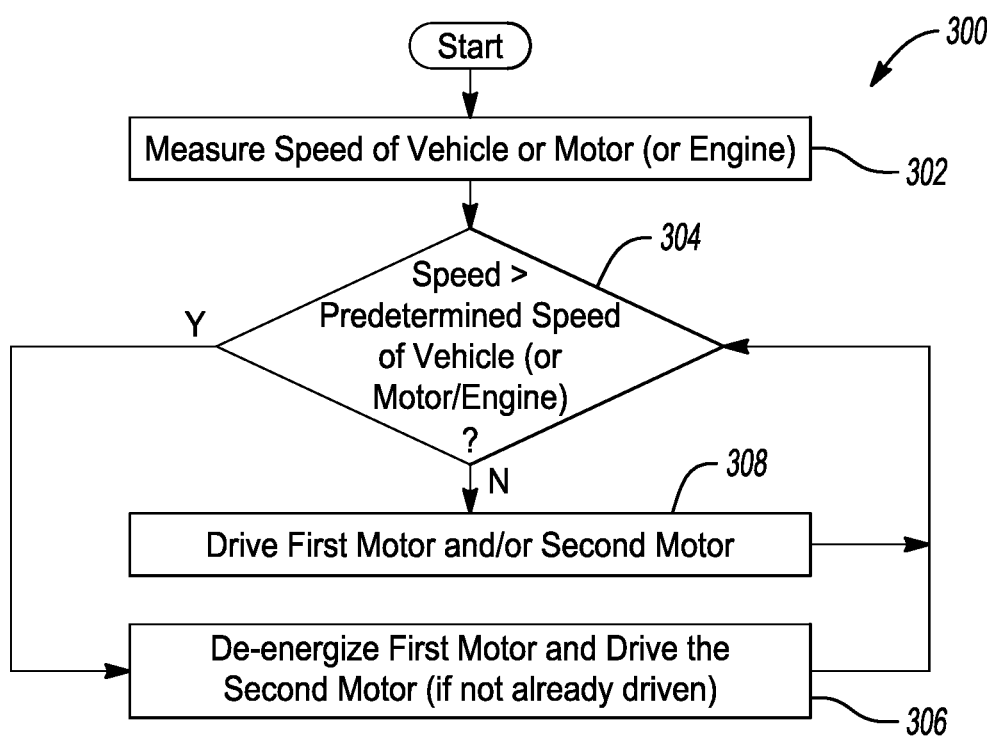
FIG. 3 depicts a method for providing a high torque and high speed for an EV truck or EV commercial vehicle application in accordance to one embodiment.

FIG. 3 depicts a method 300 for providing a high torque and high speed for an EV truck or EV commercial vehicle application in accordance to one embodiment.

In operation 302, the sensor 120 measures the RPM or torque of the first motor 102 and provides the same to the controller 118. Additionally or alternatively, the sensor 122 provides engine speed or vehicle speed to the controller 118.

In operation 304, the controller 118 compares the measured RPM (or motor speed (or engine speed) to the predetermined RPM limit. Additionally or alternatively, the controller 118 compares the vehicle speed (or engine speed (e.g. engine RPM)) to the predetermined vehicle speed limit. If the measured RPM is greater than the predetermined RPM limit, or the measured speed is greater than the predetermined vehicle speed limit, then the method 300 moves to operation 306. If not, then the method 300 moves to operation 308. The predetermined speed limit may correspond to the predetermined RPM (or engine speed) limit or to the predetermined vehicle speed limit.

In operation 306, the controller 118 may deenergize the first motor 102 while energizing the second motor 104 to meet the desired vehicle speed as required by the driver. It is recognized that the second motor 104 may be energized prior to the first motor 102 being deenergized. For example, the second motor 104 may be energized prior to the first motor 102 being deenergized if the desired torque for the truck 101 exceeds the torque that can otherwise be provided by the first motor 102. If the first motor 102 is already running to provide torque, and the demand for torque increases, the controller 118 prioritizes that the first motor 102 continue to provide torque since the first motor 102 is already running. The controller 118 may then energize the second motor 104 to provide the additional torque to meet the overall torque demand for the truck 101. Once the desire torque demand is met, the second motor 104 remains energized as the first motor 102 is deenergized to meet the desired vehicle speed as required by the driver. Additionally, the second motor 104 may be deenergized prior to the first motor 102 being deenergized and then may be subsequently energized once the method 300 reaches operation 306.

In operation 308, the controller 118 continues to energize the first motor 102 and/or the second motor 104.

While the method 300 generally corresponds to the operations performed by the system 100, it is recognized that the method 300 also generally applies to the system 200 with the exception of the clutch 202 being engaged or disengaged in the manner noted above.

FIG. 4 depicts various regions 400, 402 that illustrate operating modes for the first motor 102 and/or the second motor 104 in accordance to one embodiment. Region 400 generally depicts that the first motor 102 and the second motor 104 may be active as the EV truck 101 may be operating at a low to medium vehicle speed while having to provide varying degrees of torque. Region 402, the second motor 104 is energized as the engine speed exceeds the predetermined RPM limit 460 (e.g., engine speed) and the first motor 102 is deenergized.

Referring back to region 400, line 450 generally illustrates a curve for an inductance or reluctance-based motor for the first motor 102. Line 454 generally illustrates a curve for a high-speed permanent magnet AC based motor for the second motor 104. Line 455 generally illustrates a high efficiency operating area for the first motor 102. Line 456 generally illustrates a curve for a combined available torque for the first motor 102 and the second motor 104. Line 458 generally illustrates a combined power curve for a high torque motor curve and a high-speed motor curve.

At 462, this condition illustrates that the first motor 102 is deenergized while the second motor 104 (e.g., the permanent magnet motor) is energized and that the second motor 104 torque while the speed of the vehicle is greater than the predetermined speed limit. At 464, this condition illustrates that second motor 104 while implemented as a permanent magnet motor exhibits a high efficiency when the vehicle speed is greater than the predetermined speed limit since this is a high-speed motor. It is noted that the types of motors identified in FIG. 4 are intended to serve as examples.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for a class 7 or 8 vehicle, the system comprising:
    a first motor configured to generate torque for the vehicle;
    a second motor configured to drive an engine of the vehicle such that the vehicle meets a desired speed as set forth by a driver; and
    a controller being configured to:
        drive at least one of the first motor and the second motor;
        receive a first signal indicative of a speed of the vehicle; and
        deactivate the first motor if the speed of the vehicle is greater than a predetermined speed limit.

2. The system of claim 1 wherein the controller is further configured to activate only the second motor if the speed of the vehicle is greater than the predetermined speed limit.

3. The system of claim 1, wherein the first motor is an inductance motor or a switched reluctance motor.

4. The system of claim 1, wherein the first motor is configured to remain coupled to a driveline of a vehicle transmission after the first motor has been deactivated by the controller.

5. The system of 1, wherein the vehicle is one of the class 7 vehicle that includes a gross weight limit of between 26,001-33,000 pounds and the class 8 vehicle that includes a gross weight of 33,001 pounds or more.

6. A system for a class 7 or 8 vehicle, the system comprising:
    a first motor configured to generate torque for the vehicle;
    a second motor configured to drive an engine of the vehicle such that the vehicle meets a desired speed as set forth by a driver; and
    a controller being configured to:
        drive at least one of the first motor and the second motor;
        receive a first signal indicative of a speed of one of the first motor or the second motor; and
        deactivate the first motor if the speed is greater than a predetermined speed limit.

7. The system of claim 6, wherein the controller is further configured to activate only the second motor if the speed is greater than the predetermined speed limit.

8. The system of claim 6, wherein the first motor is an inductance motor or a switched reluctance motor.

9. The system of claim 6, wherein the first motor is configured to remain coupled to a driveline of a vehicle transmission after the first motor has been deactivated by the controller.

10. The system of 6, wherein the vehicle is one of the class 7 vehicle that includes a gross weight limit of between 26,001-33,000 pounds and the class 8 vehicle that includes a gross weight of 33,001 pounds or more.

11. A system for a class 7 or 8 vehicle, the system comprising:
a first motor configured to generate torque for the vehicle;
a second motor configured to drive an engine of the vehicle such that the vehicle meets a desired speed as set forth by a driver; and
a clutch being configured to:
couple at least one of the first motor and the second motor to a driveline of a transmission to generate the torque for the vehicle; and
disengage the first motor from the driveline if a speed of the vehicle is greater than a predetermined speed limit.

12. The system of claim 10, wherein the clutch engages only the second motor to the driveline if the speed of the vehicle is greater to than the predetermined speed limit.

13. The system of claim 11, wherein the first motor and the second motor are permanent magnet motors.

14. A system for a class 7 or 8 vehicle, the system comprising:
a first motor configured to generate torque for the vehicle;
a second motor configured to drive an engine of the vehicle such that the vehicle meets a desired speed as set forth by a driver; and
a clutch being configured to:
couple at least one of the first motor and the second motor to a driveline of a transmission to generate the torque for the vehicle and to drive the engine of the vehicle such that the vehicle meets the desired speed as set forth by the driver; and
disengage the first motor from the driveline if a speed of one of the first motor and the second motor is greater than a predetermined speed limit.

15. The system of claim 14, wherein the clutch engages only the second motor to the driveline if the speed of one of the first motor and the second motor is greater than the predetermined speed limit.

16. The system of claim 14, wherein the first motor and the second motor are permanent magnet motors.

17. A method comprising:
generating torque for a class 7 or 8 vehicle with a first motor;
driving an engine of the class 7 or 8 vehicle with a second motor such that the class 7 or 8 vehicle meets a desired speed as set forth by a driver;
electronically controlling at least one of the first motor and the second motor;
electronically receiving a first signal indicative of a speed of the vehicle; and
electronically deactivating the first motor if the speed of the vehicle is greater than a predetermined speed limit.

18. The method of claim 17 further comprising electronically activating only the second motor if the speed of the vehicle is greater than the predetermined speed limit.

19. The method of claim 17, wherein the first motor is an inductance motor or a switched reluctance motor.

20. The method of claim 17, wherein the first motor is configured to remain coupled to a driveline of a vehicle transmission after the first motor has been deactivated by the controller.

* * * * *